(No Model.) 4 Sheets—Sheet 1.
J. J. JOHNSTON.
METHOD OF MAKING BLANKS FOR SHOVELS.
No. 385,808. Patented July 10, 1888.
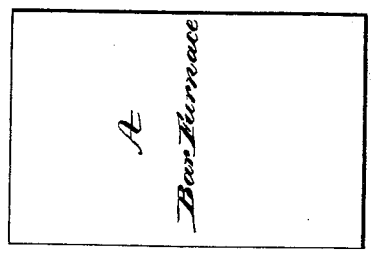
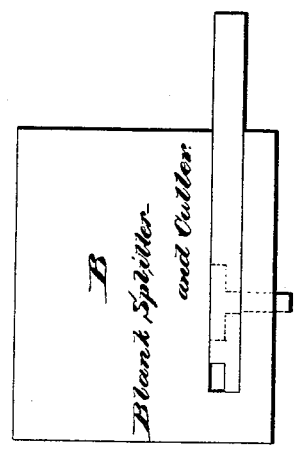
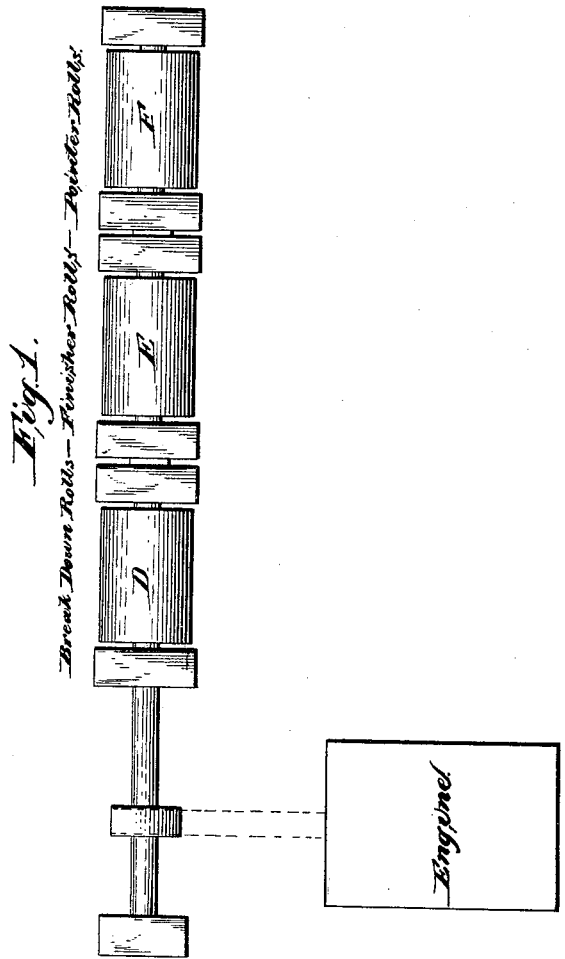
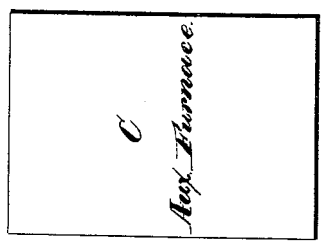
Witnesses:
Wm. H. Scott
Wm. E. Dyre
Inventor
J. J. Johnston
By Johnston, Kimball & Dyre
his Attorneys (No Model.) 4 Sheets—Sheet 2.
J. J. JOHNSTON.
METHOD OF MAKING BLANKS FOR SHOVELS.
No. 385,808. Patented July 10, 1888.
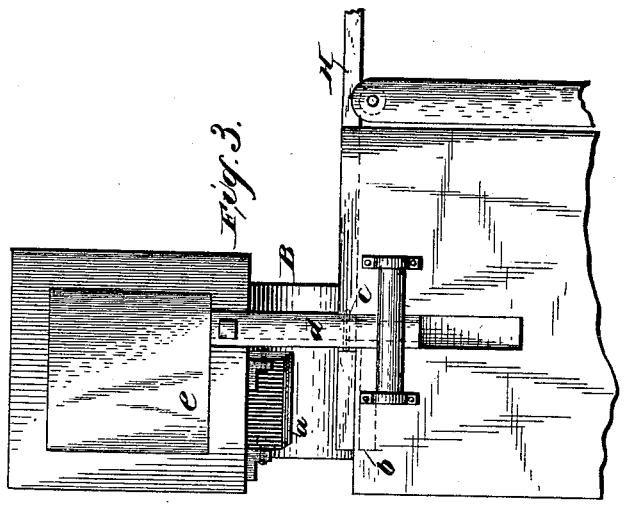
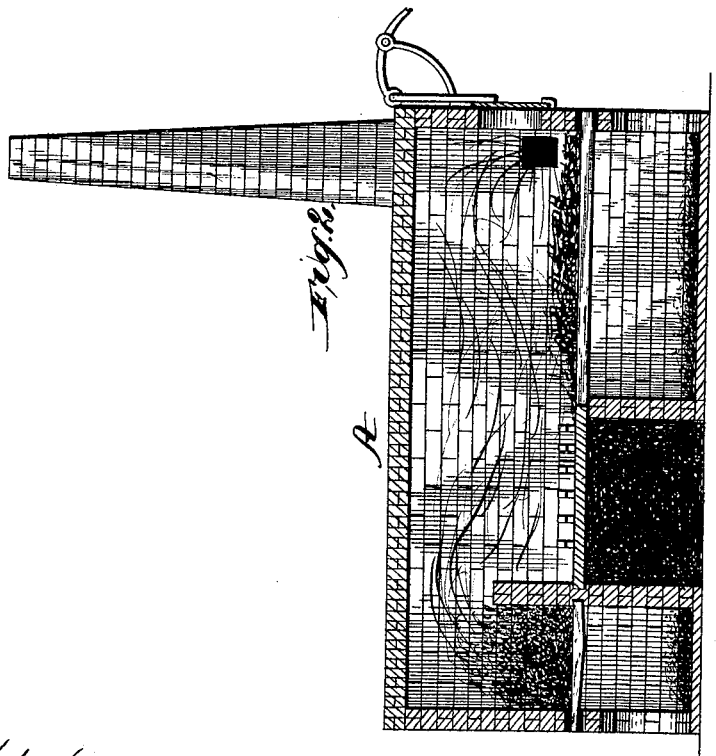

(No Model.) 4 Sheets—Sheet 3.
J. J. JOHNSTON.
METHOD OF MAKING BLANKS FOR SHOVELS.
No. 385,808. Patented July 10, 1888.
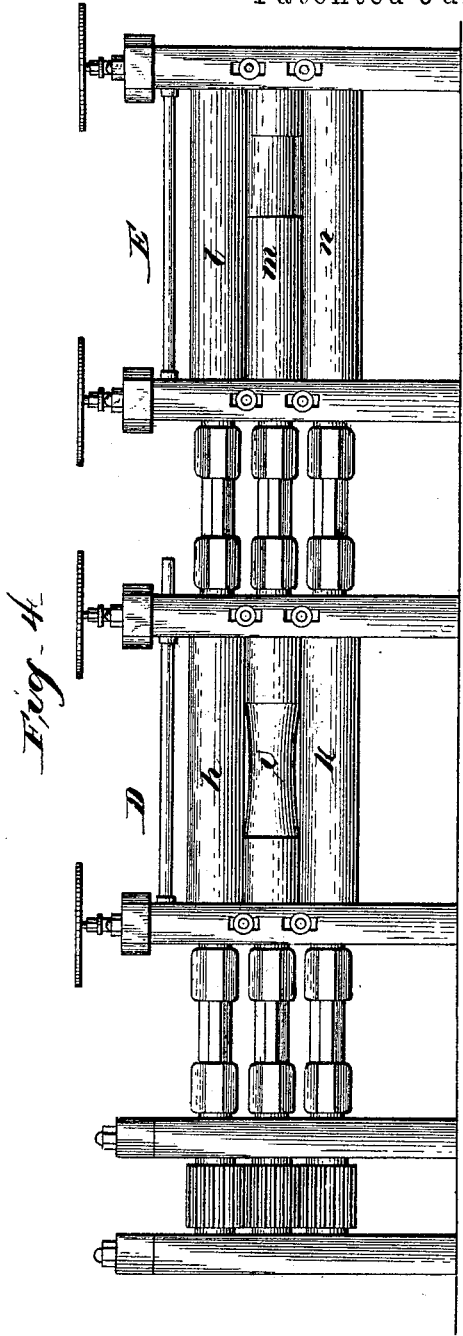

(No Model.) 4 Sheets—Sheet 4.
J. J. JOHNSTON.
METHOD OF MAKING BLANKS FOR SHOVELS.
No. 385,808. Patented July 10, 1888.
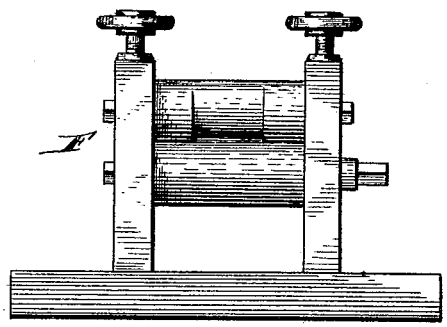
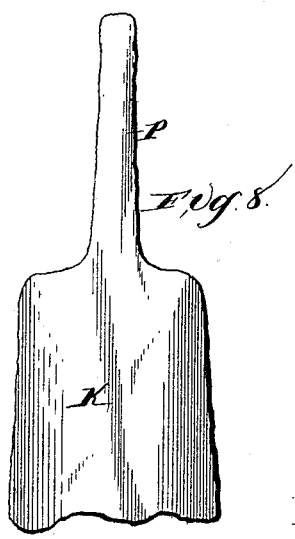
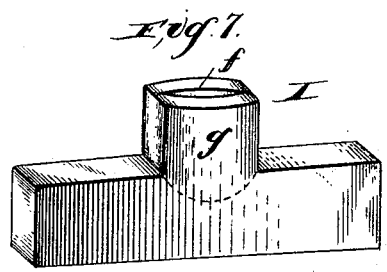
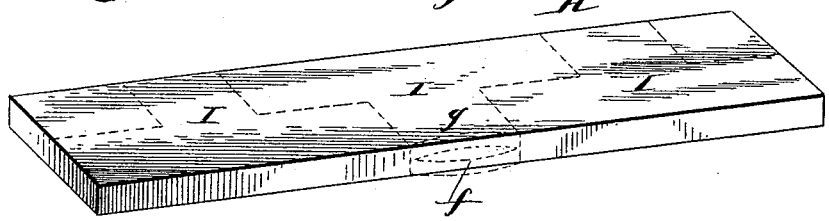

UNITED STATES PATENT OFFICE.

JAMES J. JOHNSTON, OF COLUMBIANA, OHIO, ASSIGNOR TO HENRY M. MYERS, OF BEAVER FALLS, PENNSYLVANIA.

METHOD OF MAKING BLANKS FOR SHOVELS.

SPECIFICATION forming part of Letters Patent No. 385,808, dated July 10, 1888.

Application filed March 24, 1888. Serial No. 268,347. (No model.)

*To all whom it may concern:*

Be it known that I, JAMES J. JOHNSTON, a citizen of the United States, residing at Columbiana, in the county of Columbiana and State of Ohio, have invented certain new and useful Improvements in Methods of Manufacturing Blanks for Shovels, Spades, and Scoops; and I do hereby declare the following to be a full, clear, and exact description of the invention, such as will enable others skilled in the art to which it appertains to make and use the same.

My invention relates to the art of making shovels, and has for its object an improved method of manufacturing blanks for shovels, spades, and scoops, whereby the number of machines now employed for the purpose may be reduced, the power required diminished, and the men required to operate the splitting-machine dispensed with.

The invention will be hereinafter described, and particularly pointed out in the claim.

In the accompanying drawings, which form a part of this specification, Figure 1 represents a diagrammatic view of a plant for manufacturing shovels. Fig. 2 is a vertical longitudinal section of a furnace for heating bars of metal prior to cutting blanks. Fig. 3 is a front elevation of a machine for cutting blanks and splitting their tangs. Fig. 4 is a front elevation of breaking-down and finishing rolls. Fig. 5 is a similar view of pointing-rolls. Fig. 6 is a perspective of a bar of metal from which the blanks are cut. Fig. 7 is a similar view of a blank severed from a bar with its tang split, and Fig. 8 is a plan of a blank reduced.

Reference being had to the drawings and the letters marked thereon, A, in Fig. 1, represents a furnace for heating bars of metal for cutting blanks therefrom, and is shown in Fig. 2.

B is a machine for cutting blanks, splitting the tang, and forming the socket for the end of a wooden handle, and is shown in Fig. 3. This machine is provided with a knife, $a$, a die, $b$, a knife, $c$, and a wedge, $d$, attached to the head $e$ of the machine, for the purpose of cutting incisions in the edge of the bar H and cutting blanks I therefrom. The bar H is fed into the machine, and at each downstroke of the head $e$ an incision, $f$, is made in the edge of the bar in that portion thereof which, when the blank I is cut from it, constitutes the tang $g$. The same stroke severs a blank from the bar. The construction and operation of this machine are fully set forth and claimed in my application, Serial No. 268,523, filed herewith, and need not therefore be more fully herein described. By the use of this machine the work heretofore done in two machines is accomplished in one and the labor of two attendants dispensed with, while the work of making finished blanks is correspondingly expedited.

C, in Fig. 1, is an auxiliary furnace, which may or may not be used, and is provided for the purpose of nursing heated blanks should any stoppage occur in the operation of reducing them.

D represents the breaking-down rolls, which are formed three rolls high, so that the blanks can be rolled from both sides of the rolls, instead of from one side only, as now practiced. In these rolls the roller passes the blank between the rolls $i$ and $k$, and the catcher returns them between the rolls $h$ and $i$, thus reducing the time now required to break down blanks.

E represents the finishing-rolls, which are also three rolls high, the upper roll, $l$, and the lower roll, $n$, being plain cylindrical rolls, while the middle roll, $m$, is provided with a plain cylindrical portion and an eccentric pass, $o$. The blanks are passed through the cylindrical portions of these rolls in the same manner as in the former; but to draw out the tang to form the full length of the handle-straps $p$ of the finished blade K the roller enters the blank tang foremost into the eccentric pass $o$, which delivers the blank toward him until the handle-straps have been fully drawn out.

F represents the pointing-rolls.

The operation is as follows: A bar of predetermined width and thickness is heated, incisions cut in each blade of the bar alternately as the bar is turned by the operator, and blanks severed from the bar. The tang of the blank is split and the socket formed; but the incision in the tang does not extend clear across the tang, as shown in Fig. 7. The blank is then passed through the several rolls consecutively, until fully reduced and pointed, in making black shovels; but in polished work the blank after leaving the finishing-rolls is subjected to the pickle or acid bath for removing scale from the blade. After leaving the pickle-bath the blank is pointed by passing it through the pointing-rolls. The blank is now ready for the trimming process, which will release the edges of the handle-straps, which were held against spreading while passing through the rolls by the uncut portion on the edges of the tang.

The blank with its tang partly severed is claimed in my application Serial No. 268,522.

Having thus fully described my invention, what I claim is—

The method of manufacturing shovel-blanks herein described, which consists in heating a bar of metal, cutting incisions in the edge, and severing blanks with split tangs therefrom, then breaking down, reducing, and pointing the blanks, substantially as set forth.

In testimony whereof I affix my signature in presence of two witnesses.

JAMES J. JOHNSTON.

Witnesses:
 D. C. REINOHL,
 WM. E. DYRE.